United States Patent
Balling et al.

[11] Patent Number: 5,991,552
[45] Date of Patent: Nov. 23, 1999

[54] METERING/RELEASE/RESET MECHANISM IN CAMERA

[75] Inventors: Edward N. Balling, Rochester; Joel S. Lawther, East Rochester, both of N.Y.

[73] Assignee: Eastman Kodak Company, Rochester, N.Y.

[21] Appl. No.: 09/093,998

[22] Filed: Jun. 9, 1998

[51] Int. Cl.$^6$ .............................. G03B 1/00; G03B 17/42
[52] U.S. Cl. .................... 396/395; 396/396; 396/401; 396/411
[58] Field of Search ..................... 390/387, 395, 390/396, 397, 400, 401, 411, 413

[56] References Cited

U.S. PATENT DOCUMENTS

| | | | |
|---|---|---|---|
| 2,544,879 | 3/1951 | Harvey et al. | 396/392 |
| 2,847,920 | 8/1958 | Polhemus | 396/394 |
| 3,394,643 | 7/1968 | Horton et al. | 396/384 |
| 3,532,040 | 10/1970 | Ehgartner et al. | 396/392 |
| 3,696,723 | 10/1972 | Ernisse | 396/400 |
| 3,730,066 | 5/1973 | Ettischer et al. | 396/400 |
| 3,747,494 | 7/1973 | Peters | 396/400 |
| 3,968,509 | 7/1976 | Winkler et al. | 396/400 |
| 3,999,199 | 12/1976 | Beach | 396/400 |
| 4,746,946 | 5/1988 | Chan | 396/401 |
| 5,357,302 | 10/1994 | Kawamura et al. | 396/399 |
| 5,510,866 | 4/1996 | Solomon et al. | 396/395 |
| 5,521,669 | 5/1996 | Kamata | 396/401 |
| 5,555,053 | 9/1996 | Stephenson, III | 396/399 |
| 5,614,975 | 3/1997 | SanGregory et al. | 396/396 |
| 5,634,160 | 5/1997 | Lee | 396/395 |
| 5,682,569 | 10/1997 | Katsura | 396/443 |

*Primary Examiner*—Eddie C. Lee
*Attorney, Agent, or Firm*—Roger A. Fields

[57] ABSTRACT

A one-time-use camera comprising a backframe opening at which successive image areas of a filmstrip are exposed, a film winder rotatable to wind an exposed image area of the filmstrip from the backframe opening onto an exposed film roll and to advance an unexposed image area of the filmstrip to the backframe opening, a film metering member engageable with the film winder to prevent rotation of the film winder, and a release manually depressible to initiate exposure, is characterized in that the film metering member is located beneath the release for the release to automatically depress the film metering member out of engagement with said film winder when the release is manually depressed.

6 Claims, 12 Drawing Sheets

METERING/RELEASE/RESET MECHANISM IN CAMERA

FIELD OF THE INVENTION

The invention relates generally to the field of photography, and in particular to cameras. More specifically, the invention relates to a film metering/shutter release/reset mechanism in a one-time-use camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Problem

The pursuit of compactness and simplicity in one-time-use cameras is a continuous design goal.

SUMMARY OF THE INVENTION

A one-time-use camera comprising a backframe opening at which successive image areas of a filmstrip are exposed, a film winder rotatable to wind an exposed image area of the filmstrip from the backframe opening onto an exposed film roll and to advance an unexposed image area of the filmstrip to the backframe opening, a film metering member engageable with the film winder to prevent rotation of the film winder, and a release manually depressible to initiate exposure, is characterized in that:

the film metering member is located beneath the release for the release to automatically depress the film metering member out of engagement with said film winder when the release is manually depressed.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
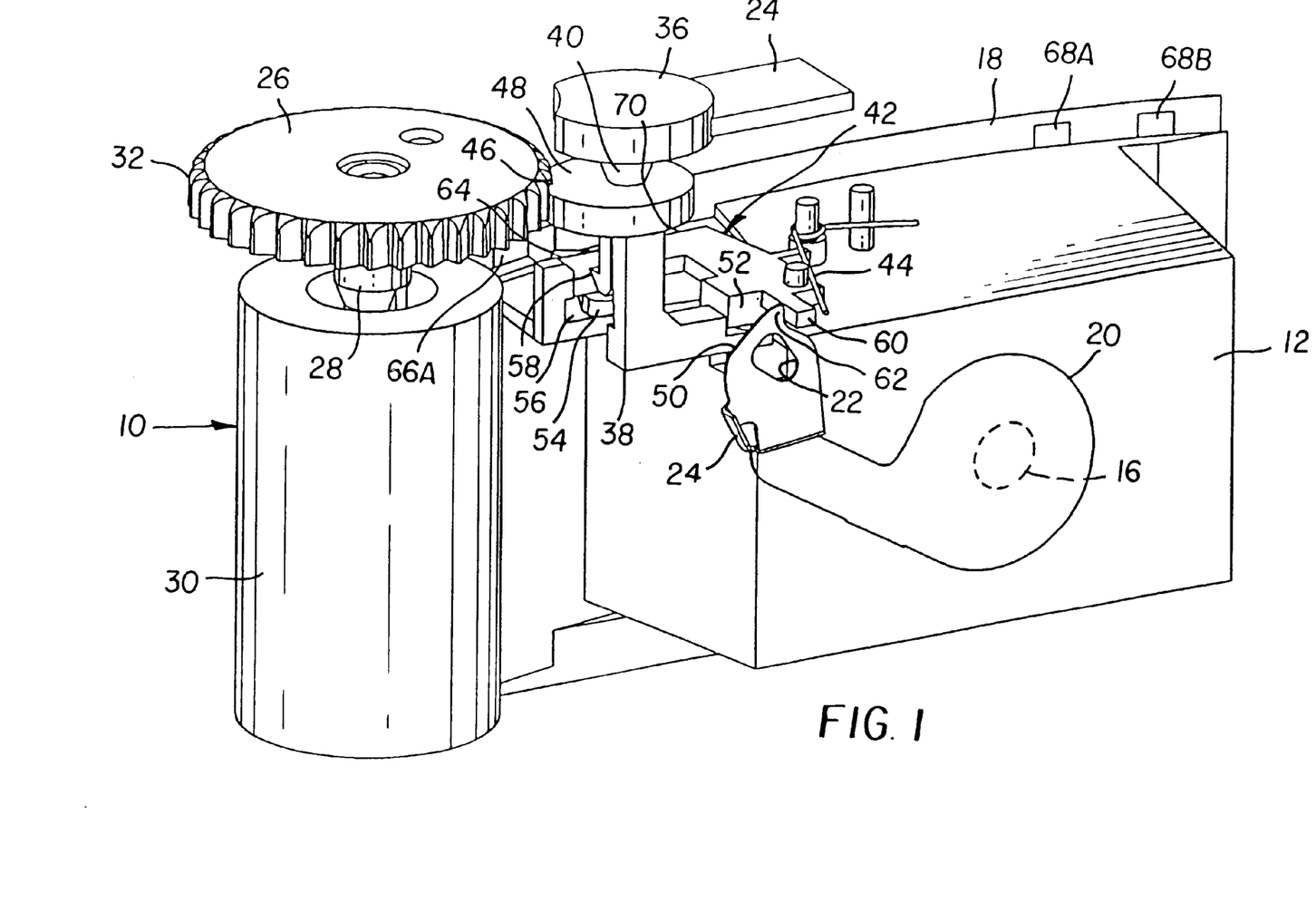
FIG. 1 is a front perspective view of a one-time-use camera according to a preferred embodiment of the invention, showing a release button prior to being manually depressed.
Figure 2:
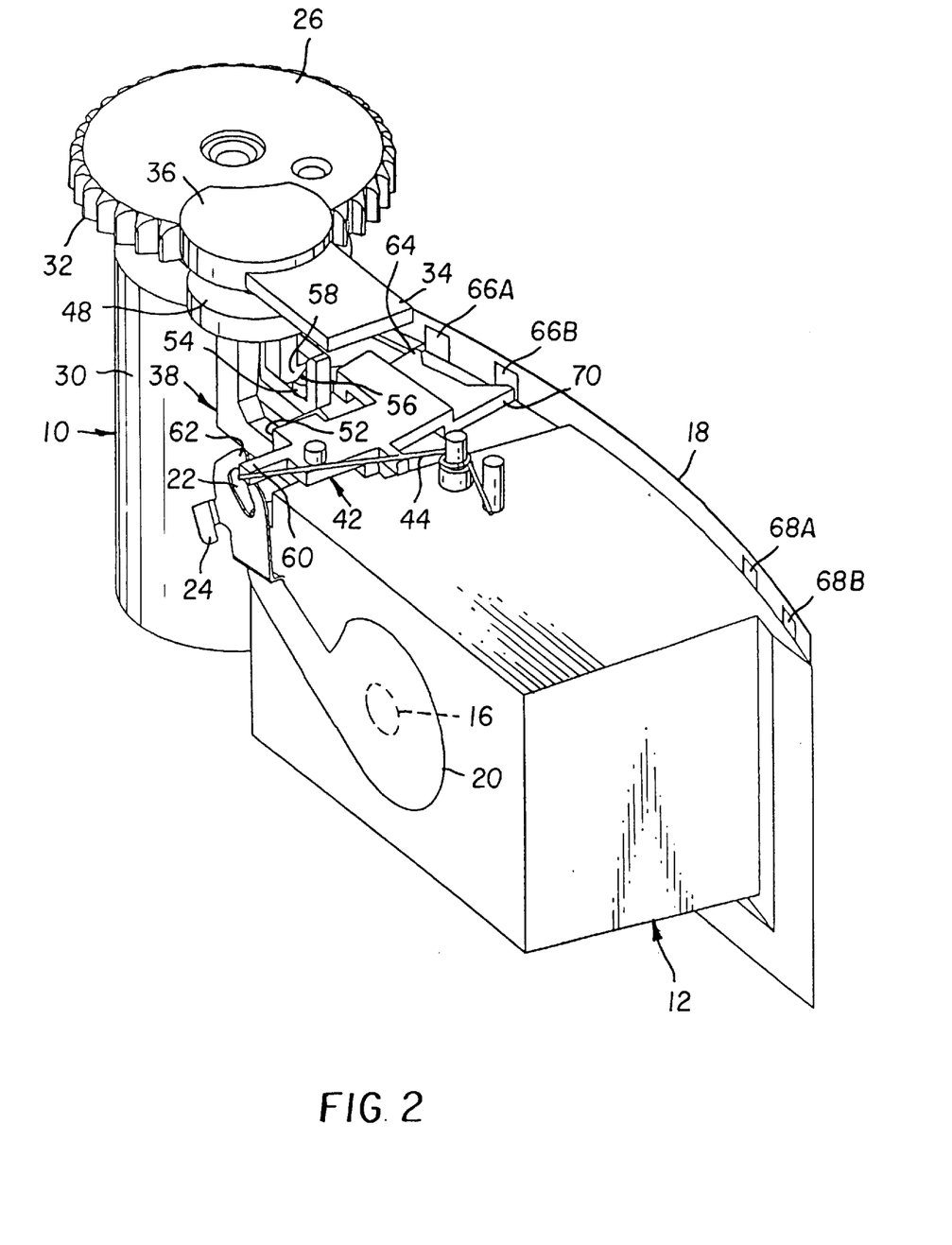
FIG. 2 is a front perspective view similar to FIG. 1, but viewed at a different angle.
Figure 10:
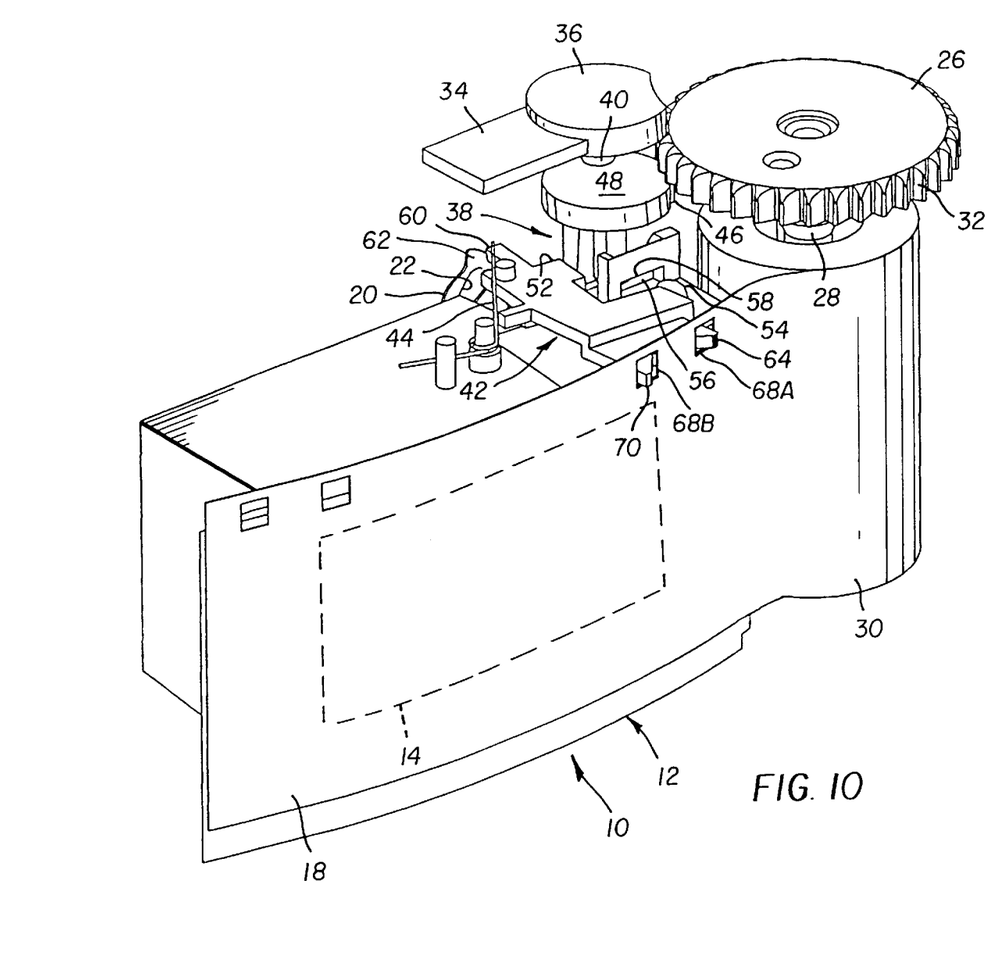
FIG. 10 is a rear perspective view of the camera, showing film winding being completed.

Referring now to the drawings, FIGS. 1, 2 and 10 partially show a one-time-use camera 10 including an opaque main body part 12. A pair of opaque front and rear cover parts (not shown) house the main body part between them. The main body part 12 has a rectangular-shaped rear backframe opening 14 and a circular-shaped front aperture 16 for exposing successive image areas of a filmstrip 18 at the backframe opening. A known shutter blade 20 normally covers the front aperture 16. The shutter blade 20 is supported on the main body part 12 at a body part post (not shown) that extends through a blade slot 22, to permit substantially pivotal opening and closing movement of the shutter blade in order to uncover and recover the front aperture 16. A return spring (not shown) is connected to a blade tab 24 and the main body part 12 to continuously urge the shutter blade 20 closed. A manual film winder, preferably a film winding thumbwheel 26 with a depending coaxial stem 28 in coaxial engagement with one end of a film take-up spool (not shown), is supported on the main body part 12 for manual winding rotation counter-clockwise in FIGS. 1 and 2 to wind each exposed imaging area of the filmstrip 18 onto an exposed film roll 30 on the film take-up spool. An anti-backup pawl (not shown) engages respective peripheral teeth 32 of the film winding thumbwheel 26 to prevent unwinding rotation of the thumbwheel. A resilient cantilevered beam 34 integral with the front cover part (not shown) has a free end that is a manually depressible release button 36. The release button 36 is intended to be manually depressed to initiate picture-taking. A metering/release/reset member 38 located beneath the release button 36 is supported on the main body part 12 to be depressed via a protrusion 40 on the underside of the release button when the release button is manually depressed. A return spring (not shown) is connected to the metering/release/reset member 38 and the main body part 12 to urge the metering/release/reset member upward against the protrusion 40. A shutter actuating member 42 is supported on the main body part 12 to be pivoted clockwise in FIGS. 1 and 2 via a high energy spring 44 and to be translated rearward and forward as will be described.

Operation

Beginning with FIGS. 1 and 2, several peripheral teeth 46 on a disk portion 48 of the metering/release/reset member 38 engage opposite ones of the peripheral teeth 32 of the film winding thumbwheel 26 to prevent manual rotation of the thumbwheel. The filmstrip 18 is then said to be "metered", i.e. its next-available unexposed image area is arrested at the backframe opening 14 ready to be exposed when the shutter blade 20 uncovers the front aperture 16. As shown in FIG. 2, a notched end portion 50 of the metering/release/reset member 38 engages a mating comer portion 52 of the shutter actuating member 42 to prevent the high energy spring 44 from pivoting the shutter actuating member clockwise in FIGS. 1 and 2. A blocking portion 54 of the shutter actuating member 42 projects forward from a slot 56 in the main body part 12 (other fixed part) and is located beneath a resilient hook portion 58 of the metering/release/reset member 38 to prevent a physical shock or jar to the camera 10, such as caused when the camera is dropped onto a hard surface, from unintentionally lowering the metering/release/reset member.

Figure 3:
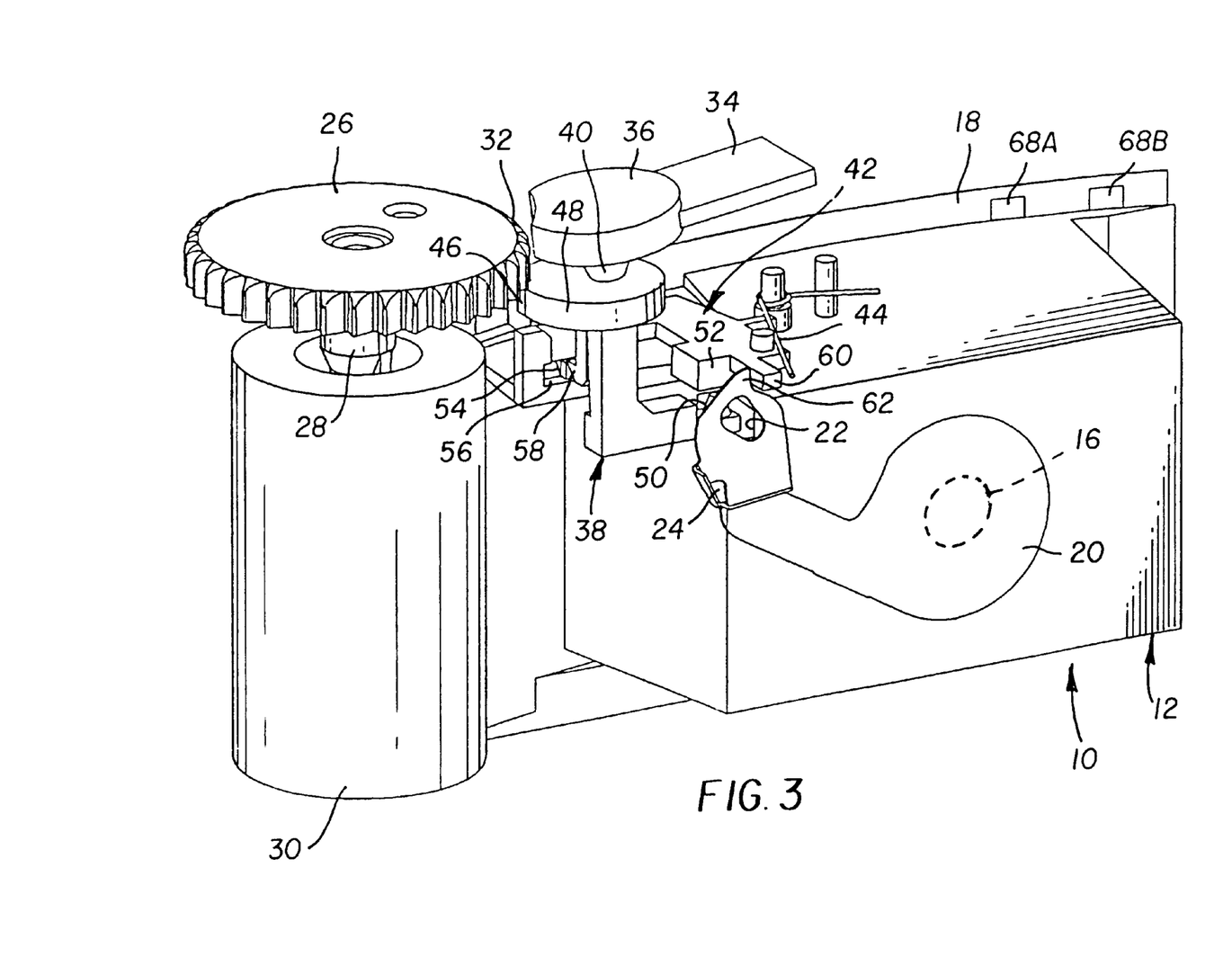
FIG. 3 is a front perspective view of the camera, showing the release button manually depressed.
Figure 4:
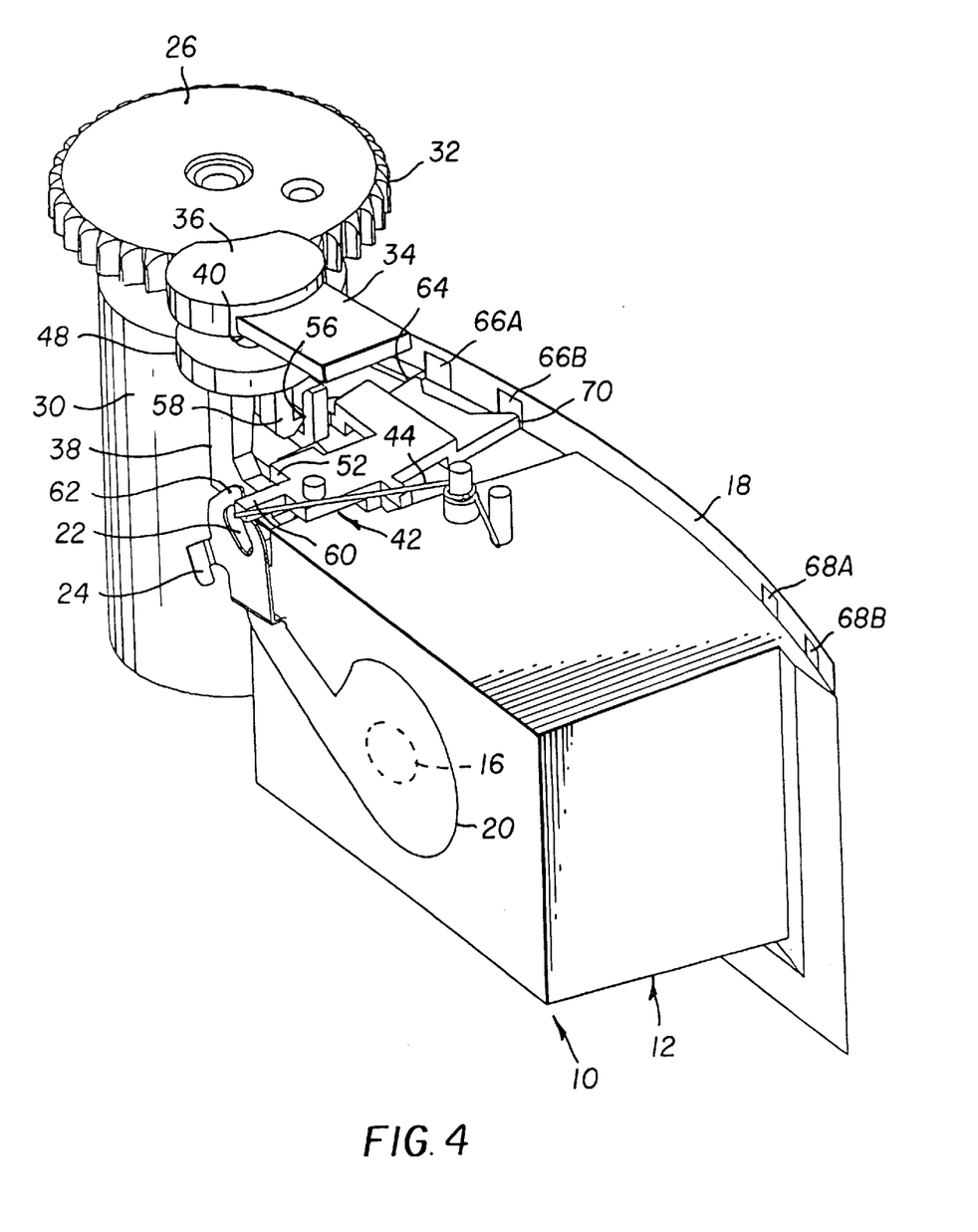
FIG. 4 is a front perspective view similar to FIG. 3, but viewed at the same angle as FIG. 2.
Figure 5:
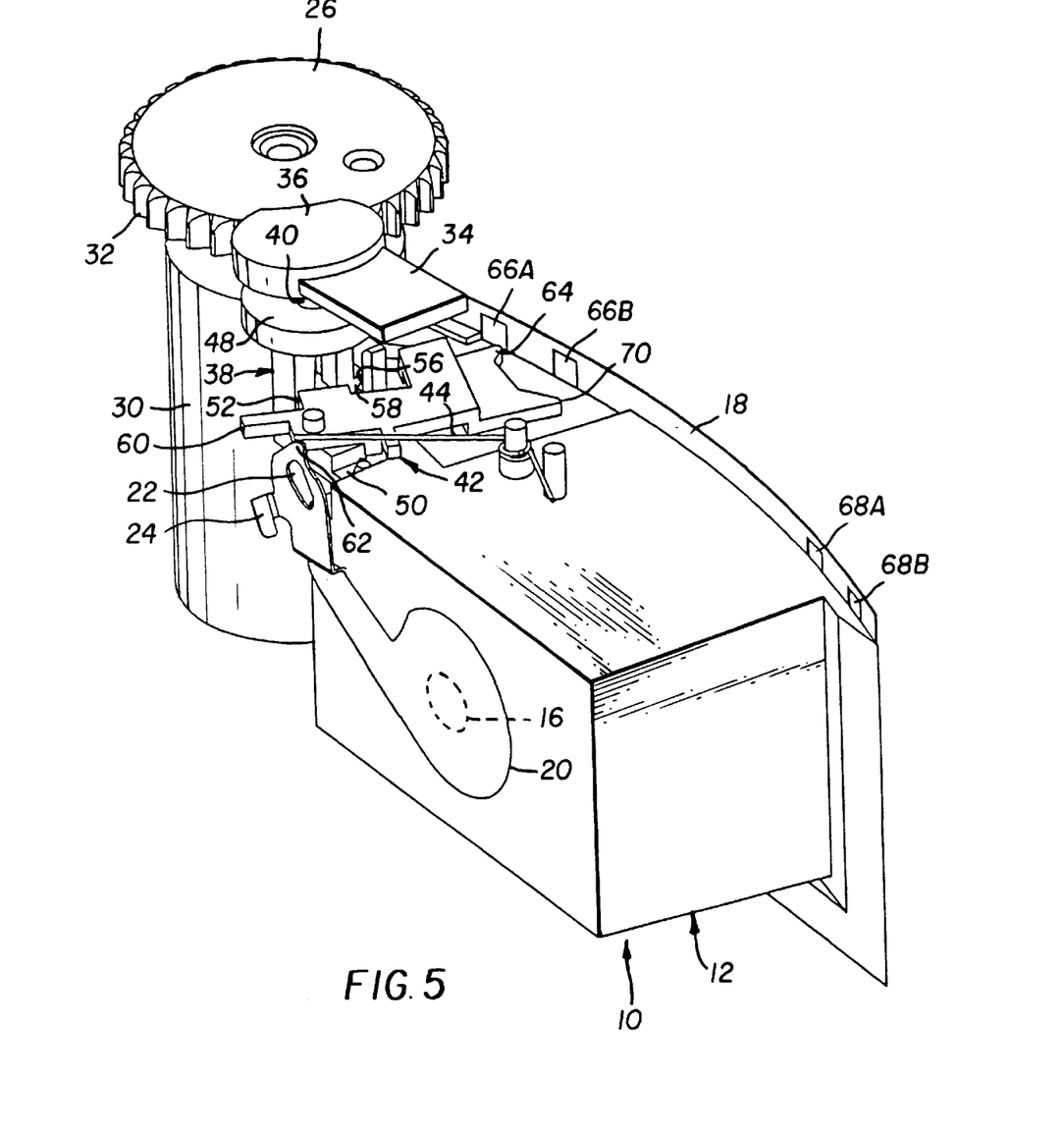
FIG. 5 is a front perspective view of the camera after a shutter blade has opened and re-closed to effect an exposure.

In FIGS. 3–5, the release button 36 is manually depressed to similarly depress the metering/release/reset member 38. Three things occur as a result. First, the resilient hook portion 58 of the metering/release/reset member 38 is immediately forced in front of the blocking portion 54 of the shutter actuating member 42 to begin to push the blocking portion rearward out of the slot 56 in the main body part 12 and, simultaneously, the notched end portion 50 of the metering/release/reset member 38 is lowered out of engagement with the mating comer portion 52 of the shutter actuating member. Then, the high energy spring 44 pivots the shutter actuating member 42 clockwise in FIG. 2 to drive a finger portion 60 of the shutter actuating member against a tip 62 of the shutter blade 20 and pivot the shutter blade counter-clockwise to uncover the front aperture 16. Once the finger portion 60 swings past the tip 62, the return spring (not shown) re-closes the shutter blade 20. At the same time, the peripheral teeth 46 of the disk portion 48 of the metering/release/reset member 38 are lowered completely out of engagement with opposite ones of the peripheral teeth 32 of the film winding thumbwheel 26 to "demeter" the filmstrip 18, i.e to permit the exposed image area at the backframe opening 14 to be wound onto the exposed film roll 30 and to advance the next-available unexposed image area to the backframe opening. The resilient hook portion 56 of the metering/release/reset member 38 snaps into the slot 58 in the main body part 12 to lock the metering/release/reset member in a lowered depressed position in which the peripheral teeth 46 of the disk portion 48 are separated from opposite ones of the peripheral teeth 32 of the film winding thumbwheel 26. Preferably, the filmstrip 18 is not demetered until the shutter blade 20 is re-closed.

Figure 6:
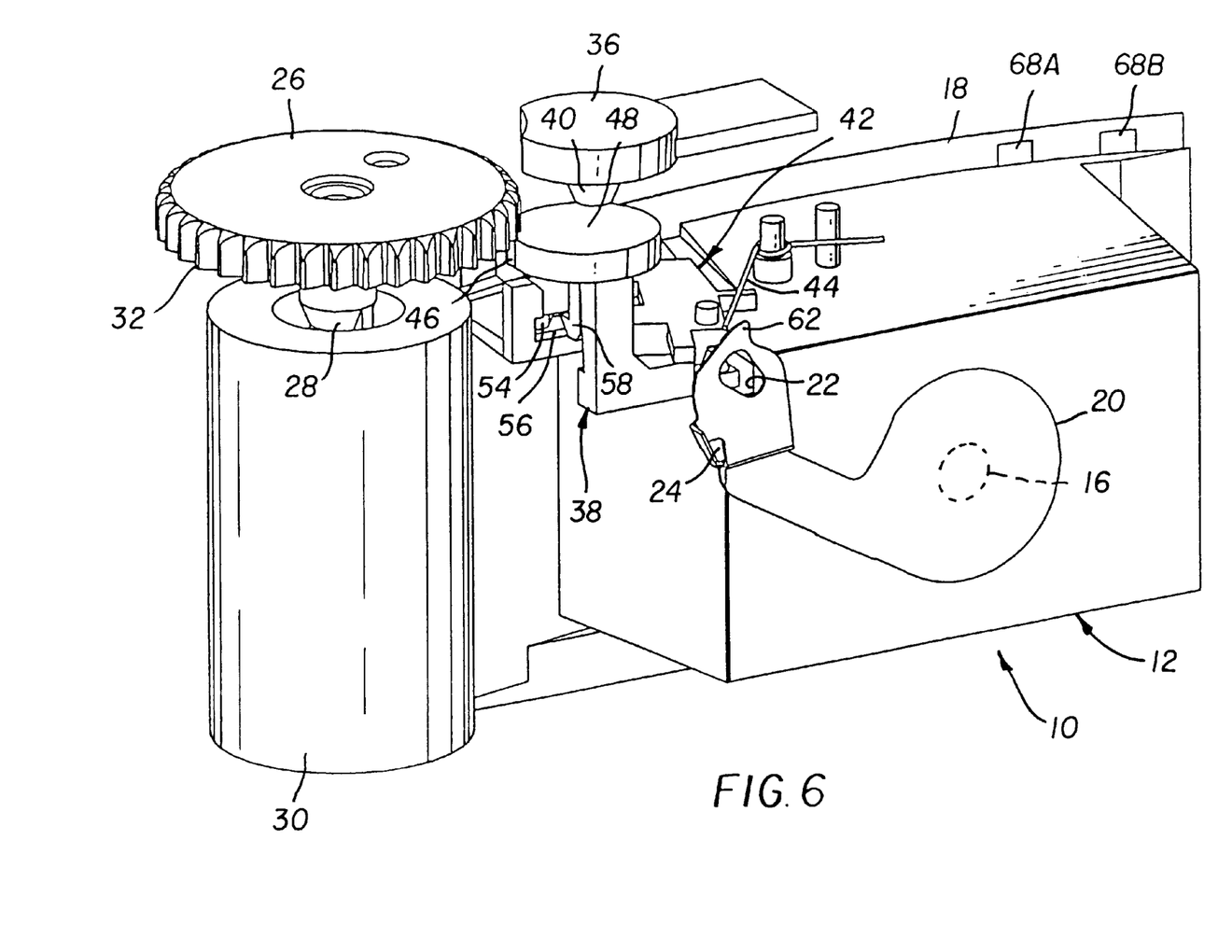
FIG. 6 is a front perspective view of the camera, showing the release button manually release from being manually depressed.

As shown in FIG. 6, when the release button 36 is manually released, the cantilvered beam 34 raises the release button to its original position and the protrusion 40 on the underside of the release button is separated from the disk portion 48 of the metering/release/reset member 38.

Figure 7:
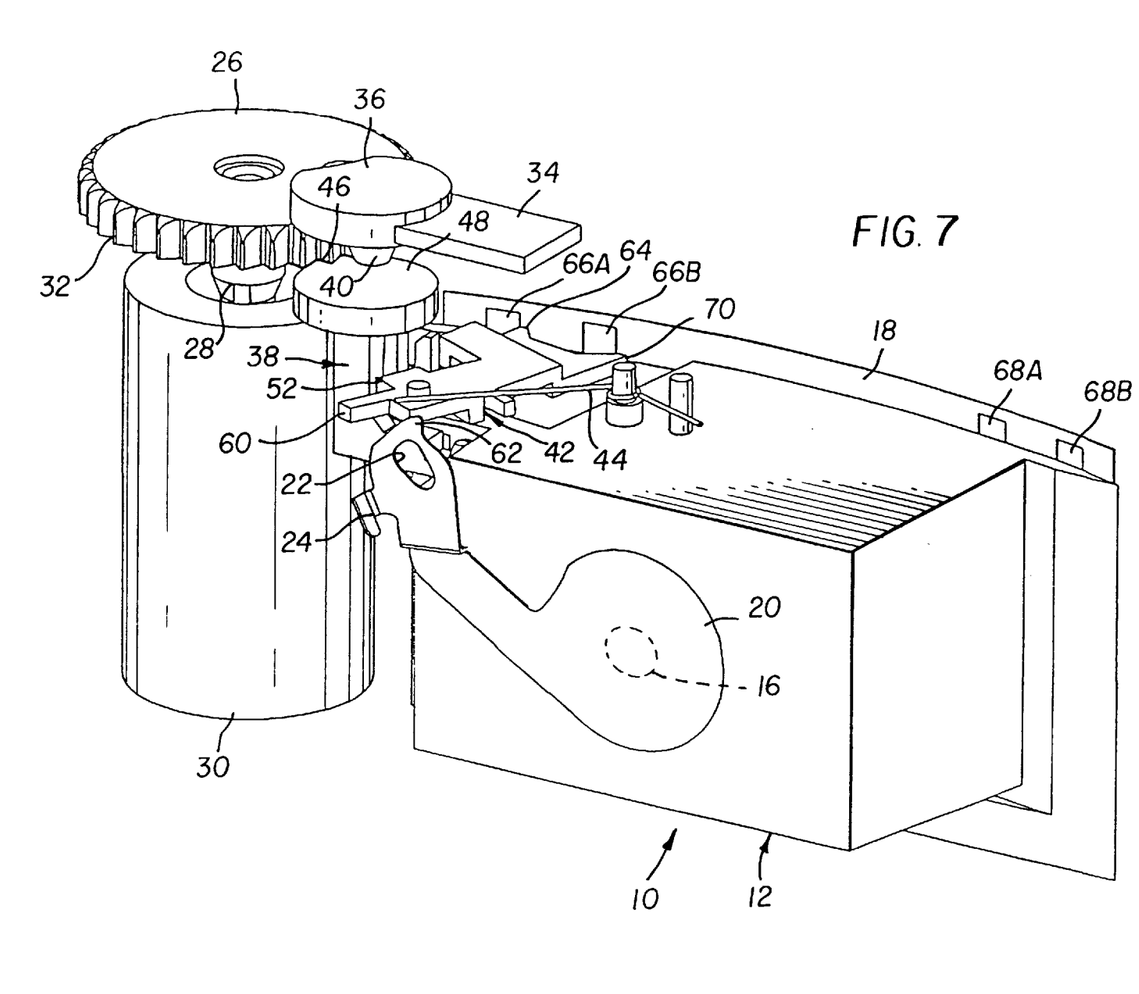
FIG. 7 is a front perspective view similar to FIG. 6, but viewed at another angle.

In FIG. 7, the high energy spring 44 has translated the shutter actuating member 42 rearwardly to move a locating tooth 64 of the shutter actuating member against the filmstrip 18, between a first perforation 66A and a close second perforation 66B in the filmstrip. This, of course, can occur before the release button 36 is manually released in FIG. 6.

Figure 8:
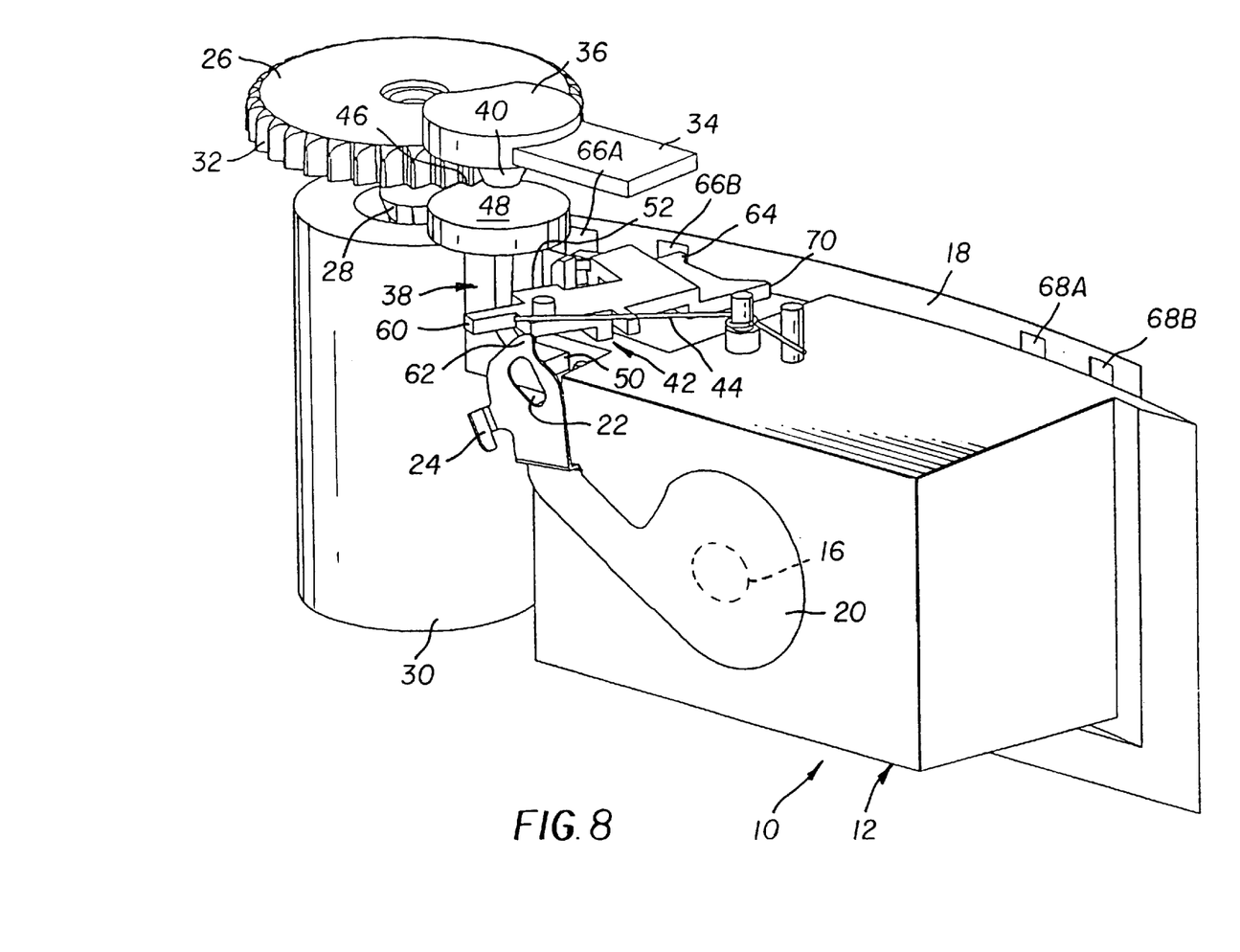
FIGS. 8 and 9 are front perspective views of the camera, showing a film winding thumbwheel windingly rotated to wind a filmstrip's exposed image area at a backframe opening onto an exposed film roll and to advance the filmstrip's next-available unexposed image area to the backframe opening.
Figure 9:
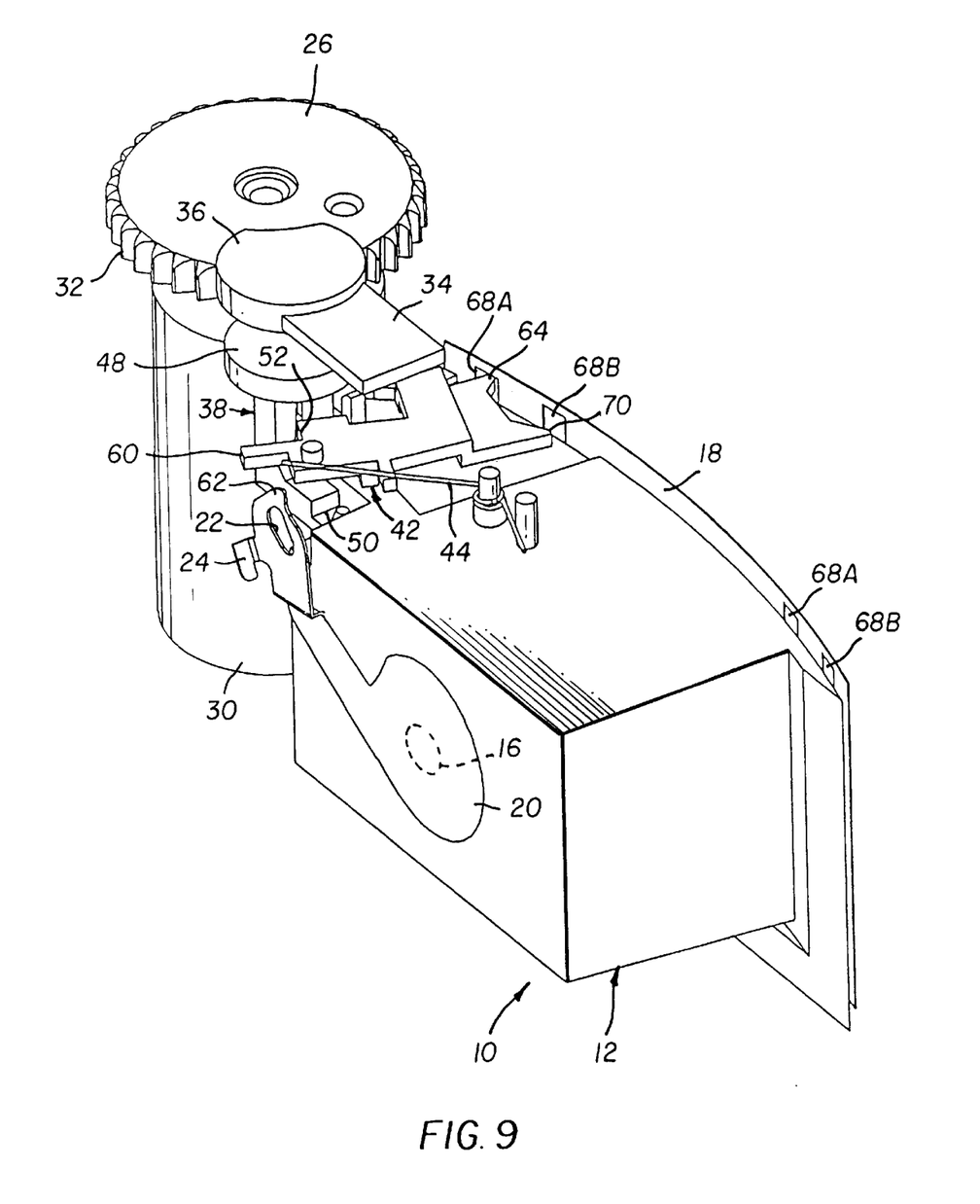

In FIGS. 8–10, the film winding thumbwheel 26 is windingly rotated counter-clockwise to wind the exposed image area at the backframe opening 14 onto the exposed film roll 30 and to advance the next-available unexposed image area to the backframe opening. FIG. 8 shows the locator tooth 64 of the shutter actuating member 42 partly in the second film perforation 66B. As the filmstrip 18 is advanced to the left in FIG. 8, the locator tooth 64 will skate or slip out clockwise of the second film perforation 66B and come to rest against the filmstrip. FIG. 9 shows the locator tooth 64 in the next-available first perforation 68A in the filmstrip 18. A drive tooth 70 of the shutter actuating member 42 is spaced from the locator tooth 64 a distance equal to the distance between the first perforation 68A and the next-available second perforation 68B (and between the first and second film perforations 66A and 66B) in the filmstrip 18 and is twice as long as the locator tooth. As the filmstrip 18 is advanced to the left in FIG. 9, the locator tooth 64 remains in the first film perforation 68A and the drive tooth 70 will swing counter-clockwise into the second film perforation 68B. See FIG. 10.

Figure 11:
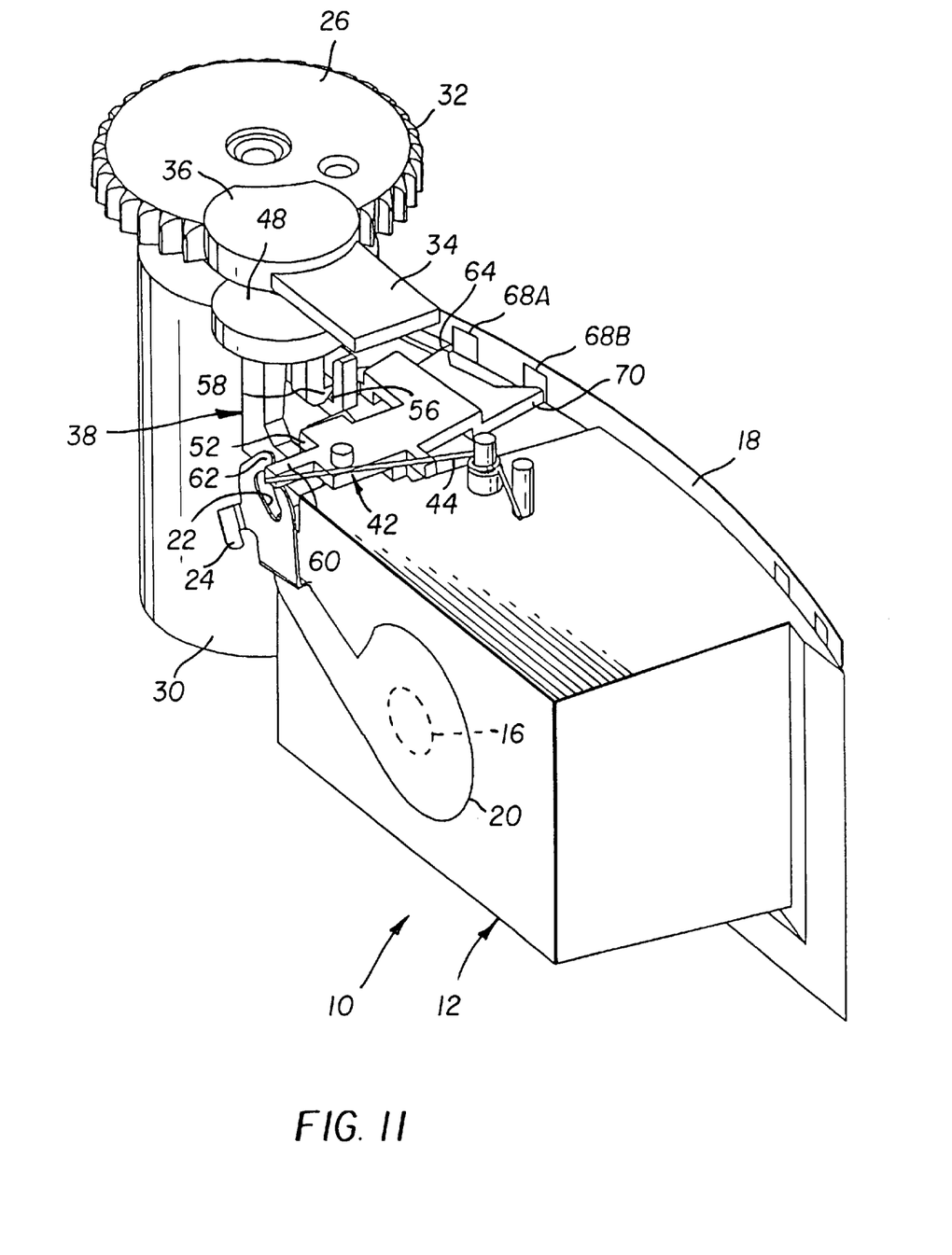
FIG. 11 is a front perspective view of the camera after film winding is completed.
Figure 12:
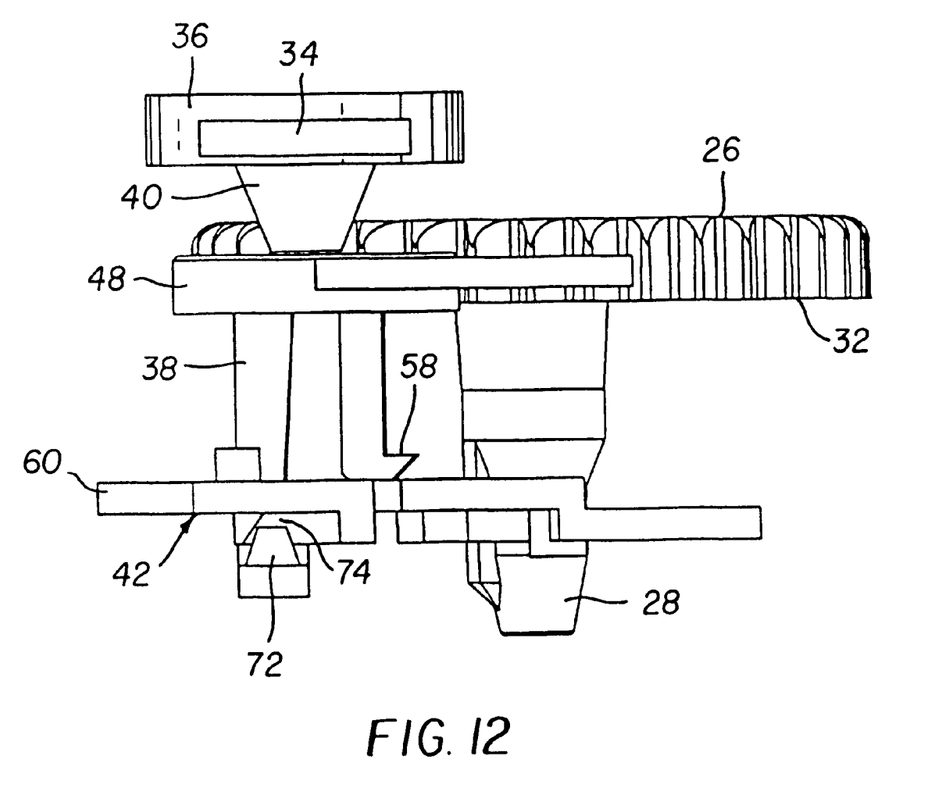
FIG. 12 is an elevation view of certain detail.

In FIG. 11, advance of the filmstrip 18 to the left is completed, i.e. the exposed image area is wound onto the exposed film roll 30 and the next-available unexposed image area is advanced to the backframe opening 14. Two things occur as a result. First, the shutter actuating member 42 is pivoted counter-clockwise sufficiently in FIG. 11 to re-position the finger portion 60 of the shutter actuating member in front of the tip 62 of the shutter blade 20, to remove the locator tooth 64 from the first film perforation 68A, and to swing the blocking portion 54 of the shutter actuating member forward through the slot 56 in the main body part 12 in order to disengage the resilient hook portion 58 of the metering/release/reset member 38 from the slot. Consequently, the metering/release/reset member 38 is no longer locked in its lowered depressed position. Then, the return spring (not shown) raises the metering/release/reset member 38 to re-engage the peripheral teeth 46 of the disk portion 48 of the metering/release/reset member with opposite ones of the peripheral teeth 32 of the film winding thumbwheel 26 in order to again "meter" the filmstrip 18. The disk portion 48 is moved against the protrusion 40 on the underside of the release button 36. As the metering/ release/reset member 38 is raised, a cone-shaped cam 72 on the metering/release/reset member acts within a complementarily-shaped open-end cavity 74 in the underside of the shutter actuating member 42 to pull the shutter actuating member forward to remove the drive tooth 70 from the second film perforation 68B and to re-locate the mating corner portion 52 of the shutter actuating member at the notched end portion 50 of the metering/release/reset member. See FIG. 12.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. rear backframe opening
16. front aperture
18. filmstrip
20. shutter blade
22. blade slot
24. blade tab
26. film winding thumbwheel
28. coaxial stem
30. exposed film roll
32. thumbwheel peripheral teeth
34. cantilevered beam
36. release button
38. metering/release/rest member
40. protrusion
42. shutter actuating member
44. high energy spring
46. disk peripheral teeth
48. disk portion
50. notched end portion
52. mating comer portion
54. blocking portion
56. slot
58. hook portion
60. finger portion
62. blade tip
64. locating tooth
66A. first perforation
66B. second perforation
68A. first perforation
68B second perforation
70. drive tooth
72. cam
74. cavity

What is claimed is:

1. A one-time-use camera comprising a backframe opening at which successive image areas of a filmstrip are exposed, a film winder rotatable to wind an exposed image area of the filmstrip from said backframe opening onto an exposed film roll and to advance an unexposed image area of the filmstrip to the backframe opening, a film metering member engageable with said film winder to prevent rotation of the film winder, and a release manually depressible to initiate exposure, is characterized in that:

said release returns to an original position when the release is manually released from being manually depressed;

said film metering member is located beneath said release for the release to automatically depress the film metering member out of engagement with said film winder when the release is manually depressed, and has a hook portion that is engaged to retain said film metering member depressed out of engagement with said film winder when said release returns to th e original position;

a fixed body part has a slot located to receive said hook portion for the hook portion to be engaged to retain said film metering member depressed out of engagement with said film winder; and a shutter actuating member movable to actuate a shutter blade has a blocking portion that projects through said slot to prevent said hooked portion from entering the slot and is moved out of said slot to allow the hooked portion to enter the slot when said shutter actuating member is moved to actuate said shutter blade.

2. A one-time-use camera as recited in claim 1, wherein said shutter actuating member is movable to return said blocking portion to said slot in order to force said hooked portion out of the slot when said film winder is rotated to wind an exposed image area of the filmstrip from said backframe opening onto an exposed film roll and to advance an unexposed image area of the filmstrip to the backframe opening.

3. A one-time-use camera as recited in claim 1, wherein said film metering member and said shutter actuating member having mating portions that engage to prevent movement of the shutter actuating member to actuate said shutter blade and which disengage when the film metering member is depressed.

4. A one-time-use camera as recited in claim 1, wherein said blocking portion is located beneath a corresponding portion of said film metering member to prevent a physical shock or jar to said camera, caused when the camera is dropped onto a hard surface, from unintentionally moving the film metering member out of engagement with said film winder, but said corresponding portion is constructed to force said blocking portion out of the way when said film metering member is depressed responsive to manual depression of said release.

5. A one-time-use camera as recited in claim 1, wherein said film winder has peripheral teeth, and said film metering member is non-rotatable and has peripheral teeth that engage opposite ones of said peripheral teeth of the film winder to prevent rotation of the film winder and which disengage from the peripheral teeth of the film winder to permit rotation of the film winder when the film metering member is depressed.

6. A one-time-use camera comprising a backframe opening at which successive image areas of a filmstrip are exposed, a film winder rotatable to wind an exposed image area of the filmstrip from said backframe opening onto an exposed film roll and to advance an unexposed image area of the filmstrip to the backframe opening, an engageable member engageable with said film winder to prevent rotation of the film winder, and a release manually depressible to initiate exposure, is characterized in that:

said release returns to an original position when the release is manually released from being manually depressed;

said engageable member is located for said release to cause movement of the engageable member out of engagement with said film winder when the release is manually depressed, and has a portion that is engaged to retain said engageable member out of engagement with said film winder when said release returns to the original position;

a slot is located to receive said portion of the engageable member for the portion to be engaged to retain said engageable member out of engagement with said film winder; and a shutter actuating member has a blocking portion that projects through said slot to prevent said portion of the engageable member from entering the slot and is moved out of said slot to allow the portion to enter the slot when said shutter actuating member is moved to actuate said shutter blade.

* * * * *